(12) United States Patent
Kargilis

(10) Patent No.: US 7,097,012 B1
(45) Date of Patent: Aug. 29, 2006

(54) COMPACT TEMPERATURE COMPENSATING GAS SPRING

(75) Inventor: John S. Kargilis, Northville, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 43 days.

(21) Appl. No.: 11/060,834

(22) Filed: Feb. 18, 2005

(51) Int. Cl.
*F16F 9/52* (2006.01)

(52) U.S. Cl. .............. 188/277; 267/64.28; 188/313; 188/322.21

(58) Field of Classification Search ............ 267/64.28; 188/276, 277, 278, 313, 314, 322.21
See application file for complete search history.

(56) References Cited

U.S. PATENT DOCUMENTS

| | | | | |
|---|---|---|---|---|
| 2,357,278 A | * | 8/1944 | O'Connor | ............... 188/269 |
| 4,799,577 A | * | 1/1989 | de Carbon | ............... 188/277 |
| 5,404,972 A | * | 4/1995 | Popjoy et al. | ............ 188/277 |
| 5,722,643 A | * | 3/1998 | Chamberlin et al. | ....... 267/120 |
| 6,152,432 A | * | 11/2000 | Perrin | ............... 267/64.15 |
| 6,179,099 B1 | * | 1/2001 | Koch et al. | .............. 188/277 |

* cited by examiner

*Primary Examiner*—Devon C. Kramer

(57) ABSTRACT

A compact temperature compensating gas spring including a gas filled hollow cylinder and a piston assembly slidably received in the gas filled hollow cylinder. The piston assembly includes a piston head and a piston rod. The piston rod includes a temperature compensation chamber. The piston head includes an aperture formed therein in communication with the temperature compensation chamber. A temperature activated valve is operably connected to the aperture to control gas flow between the cylinder and the temperature compensation chamber.

7 Claims, 3 Drawing Sheets

COMPACT TEMPERATURE COMPENSATING GAS SPRING

FIELD OF THE INVENTION

This invention relates generally to gas and pneumatic springs. In particular, the invention relates to a temperature compensating gas spring having a compact design.

BACKGROUND OF THE INVENTION

Gas springs are employed in a variety of applications. Gas springs are used to assist in the opening and holding open of various hinged items such as trunk lids, engine hoods, lift gates, vehicle doors, cabinet doors, and windows. The force exerted by gas springs varies with the temperature of the gas in the spring. Higher temperatures increase gas pressures in the spring requiring higher closing forces while lower temperatures decrease gas pressures and reduce lifting and hold open forces.

Solutions exist in the art that employ secondary gas volumes separated from the primary gas volume by a temperature sensitive check valve. These secondary gas volumes, although effective in compensating for temperature variations of the gas within the gas spring, either increase the diameter or length of the gas spring. Increases in package diameter or length prevent the use of these temperature compensated gas springs, in many applications. A gas spring is needed that provides temperature compensation while maintaining a compact package profile.

FIG. 1 shows a schematic representation of one embodiment of a temperature compensating gas spring 100, in accordance with the prior art. A hollow cylinder 110 is separated into a front chamber 112 and a rear chamber 114 by a temperature compensation module (TCM) 116. A piston assembly 120 includes a solid piston 122 connected to a solid piston rod 124. Hollow cylinder 110 is charged with a pressurized gas 118, such as nitrogen, which pressurizes the front chamber 112 and the rear chamber 114.

TCM 116 operates in response to temperature. At temperatures above a design temperature of the TCM 116, the temperature compensating gas spring 100 operates as if the rear chamber 114 does not exist. When the temperature falls below the design temperature of the TCM 116, a valve 134 on the TCM 116 opens and the operating volume of the gas spring 100 is increased.

Other temperature compensation schemes exist involving various types of valves that control the flow of the gas from one area of the gas spring to another at varying rates. Still others use pumps to regulate the pressure in the gas spring. These solutions require additional components that increase their size, weight and cost. Still other temperature compensation schemes involve multiple gas types within the gas spring increasing the complexity of manufacture and requiring strict separation of the different gases.

It is therefore desirable to provide a temperature compensating gas spring that overcomes the limitations, challenges, and obstacles described above.

SUMMARY OF THE INVENTION

One aspect of the present invention provides a compact temperature compensating gas spring including a gas filled hollow cylinder and a piston assembly slidably received in the gas filled hollow cylinder. The piston assembly includes a piston head and a piston rod. The piston rod includes a temperature compensation chamber. The piston head includes an aperture formed therein in communication with the temperature compensation chamber. A temperature activated valve is operably connected to the aperture to control gas flow between the cylinder and the temperature compensation chamber.

Another aspect of the present invention provides a compact temperature compensating gas spring assembly including a gas filled hollow cylinder having a sealed end; a piston assembly slidably received in the gas filled hollow cylinder, the piston assembly having a closed end and including a piston head and a piston rod, the piston rod including a temperature compensation chamber, the piston head including an aperture formed therein in communication with the temperature compensation chamber; a temperature activated valve operably connected to the aperture to control gas flow between the cylinder and the temperature compensation chamber; a fixed component operably connected to one of the sealed end and the closed end; and a load component operably connected to the other of the sealed end and the closed end.

Another aspect of the present invention provides a compact temperature compensating gas spring including a gas filled hollow cylinder; and a piston assembly slidably received in the gas filled hollow cylinder and including a temperature compensation chamber; and means for controlling gas flow between the cylinder and the temperature compensation chamber based on temperature.

The aforementioned and other features and advantages of the invention will become further apparent from the following detailed description of the presently preferred embodiment, read in conjunction with the accompanying drawings. The detailed description and drawings are merely illustrative of the invention rather than limiting, the scope of the invention being defined by the appended claims and equivalents thereof.

DETAILED DESCRIPTION OF THE PRESENTLY PREFERRED EMBODIMENTS

Figure 1:
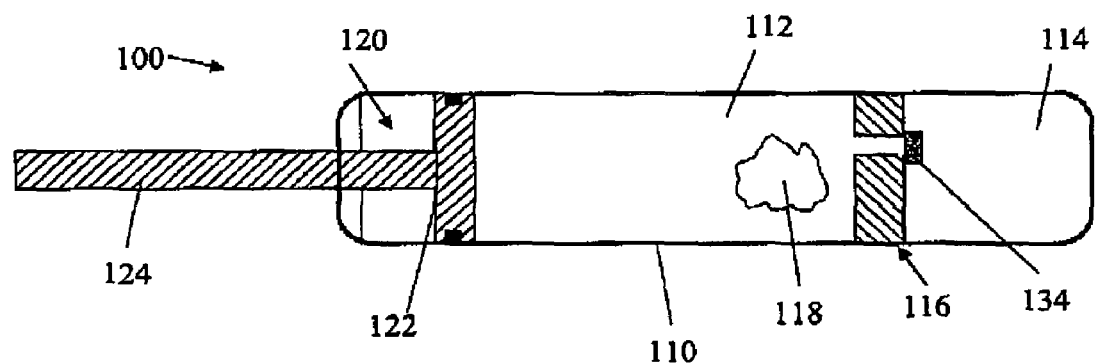
FIG. 1 shows a schematic representation a compact temperature compensating gas spring, in accordance with the prior art.
Figure 2:
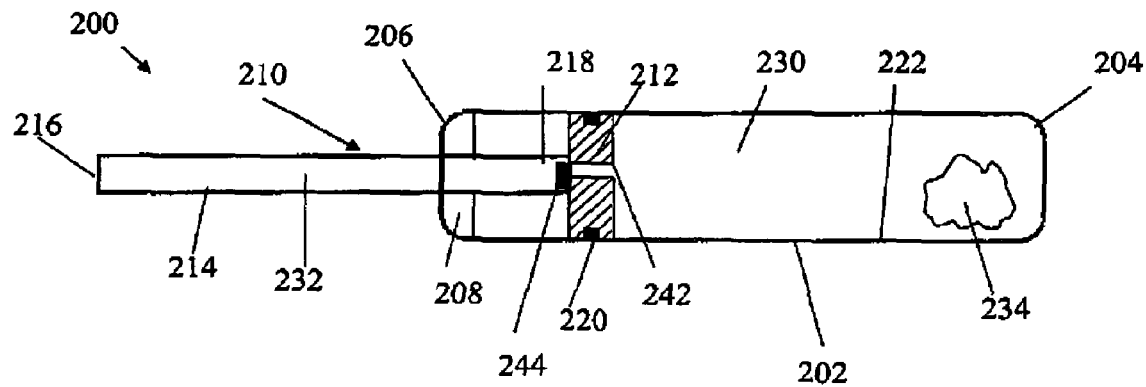
FIG. 2 shows a schematic representation of a compact temperature compensating gas spring, in accordance with the present invention.

FIG. 2 shows a schematic representation of a compact temperature compensating gas spring 200, in accordance with the present invention. A hollow cylinder 202 has a sealed end 204 and an open end 206. A piston assembly 210 including a piston 212 connected to a piston rod 214 is contained in hollow cylinder 202. Piston rod 214 extends through the open end 206 of hollow cylinder 202. A seal 208 seals hollow cylinder 202 around piston rod 214 at open end 206.

Piston rod 214 is a hollow tube closed at a first end 216 and open at a second end 218. Piston 212 is attached to the piston rod 214 at second end 218 and has sliding seal 220 contacting interior wall 222 of hollow cylinder 202.

A first chamber 230 is defined by the space within the hollow cylinder 202 bounded by piston 212 and sealed end 204. A temperature compensation chamber 232 is defined by the space within the hollow piston rod 214 bounded by the piston 212 and first end 216 of piston rod 214. The hollow cylinder 202 is charged with a pressurized gas 234, such as nitrogen, that pressurizes both the first chamber 230 and the temperature compensation chamber 232.

Piston 212 includes an aperture 242 that allows pressurized gas 234 to flow between the first chamber 230 and the temperature compensation chamber 232. The gas flow is controlled by a temperature activated valve 244 positioned on the piston 212 adjacent the aperture 242. Piston 212 in combination with aperture 242 and temperature activated valve 244 acts as a temperature compensation module TCM.

Temperature activated valve 244, operating as a check valve, opens on the first compression stroke after the temperature compensating gas spring 200 is assembled, thereby setting the TCM. Compression of the gas spring 200 by moving the piston assembly 210 into hollow cylinder 202 toward sealed end 204 increases pressure in first chamber 230 and opens the temperature activated valve 244 thereby equalizing the pressures in the first chamber 230 and the temperature compensation chamber 232. The temperature activated valve 244 closes when the pressures equalize. Subsequent compression strokes will open the temperature activated valve 244 only when the pressure in the temperature compensation chamber 232 falls below the pressure in the first chamber 230.

The output force exerted on the piston 212 pushing the piston assembly 210 in an outward direction with respect to the hollow cylinder 202 is equal to the pressure of the pressurized gas 234 within hollow cylinder 202 multiplied by the surface area of the piston 212. The opposing force exerted on the piston 212 is equal to the pressure of the pressurized gas 234 within the hollow cylinder 202 multiplied by the surface area of piston 212 reduced by the cross sectional area of piston rod 214. The result is a net positive output force pushing the piston assembly 210 in the outward direction.

At temperatures above a preset temperature, for example 10° C., the temperature activated valve 244 remains closed and the gas spring 200 operates using the first chamber 230 only. When the temperature of the pressurized gas 234 falls below the preset temperature the temperature activated valve 244 opens, and increases the effective volume of the first chamber 230 by the volume of the temperature compensation chamber 232. As the compact temperature compensating gas spring 200 extends, the rate of decompression of the pressurized gas 234 is lower as a result of the larger volume. Since the rate of decompression is lower the output force is higher than it would be without the additional volume. The temperature activated valve 244 remains open as long the temperature remains below the preset temperature. When the temperature rises above the preset temperature, temperature activated valve 244 closes.

Figure 3:
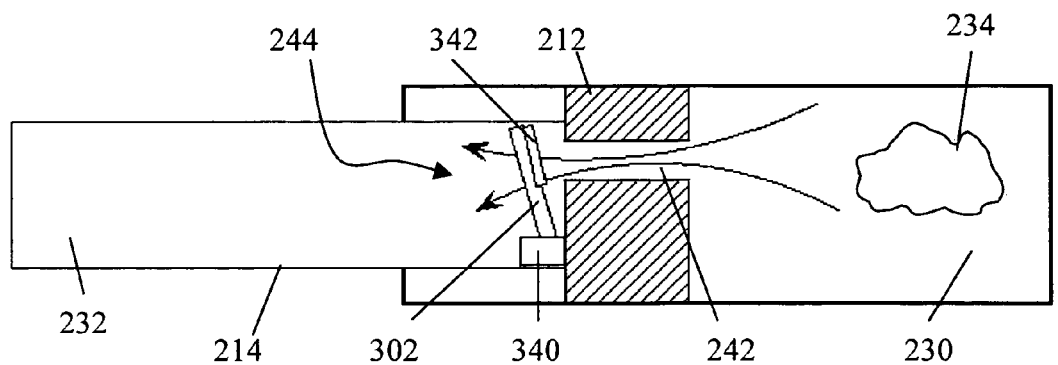
FIG. 3 shows a schematic representation of the temperature activated valve of FIG. 2 responding to a pressure difference between the first chamber and the temperature compensation chamber, in accordance with the present invention.

FIG. 3 shows a schematic representation of the temperature activated valve responding to a pressure difference between the first chamber 230 and the temperature compensation chamber 232, in accordance with the present invention. The temperature activated valve 244 includes an arm 302, operably connected to piston 212, and a valve seat 342. Arm 340 includes a bimetallic strip 302 and is positioned adjacent to aperture 242 in piston 212. Valve seat 342 covers aperture 242 when temperature activated valve 244 is in a closed position and provides an airtight seal between first chamber 230 and temperature compensation chamber 232.

At temperatures above the preset temperature the temperature activated valve 244 operates as a check valve allowing pressurized gas 234 to flow from the first chamber 230 into the temperature compensation chamber 232 in the piston rod 214. At these temperatures, the temperature activated valve 244 opens only when the pressure in the temperature compensation chamber 232 is lower than the pressure in the first chamber 230. This situation typically occurs only during the first compression stroke, when the TCM is set. When the pressures in the first chamber 230 and the temperature compensation chamber 232 equalize, the temperature activated valve 244 closes and remains closed.

Figure 3A:
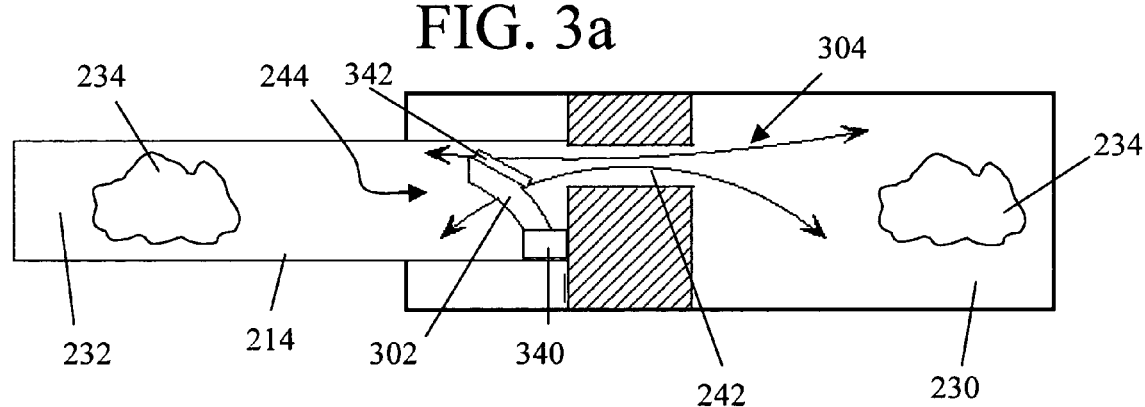
FIG. 3a shows a schematic representation of the temperature activated valve of FIG. 2 responding to temperature below the preset temperature, in accordance with the present invention.

FIG. 3a show a schematic of the temperature activated valve 244 responding to temperature below the preset temperature. At temperatures below the preset temperature, the bimetallic strip 302 deforms away from aperture 242 allowing pressurized gas 234 to flow 304 through aperture 242 and between the first chamber 230 and the temperature compensation chamber 232. While the temperature activated valve 244 is open, the pressures in the first chamber 230 and the temperature compensation chamber 232 equalize. The temperature activated valve 244 remains open until the temperature of the pressurized gas 234 rises above the preset temperature.

Figure 3B:
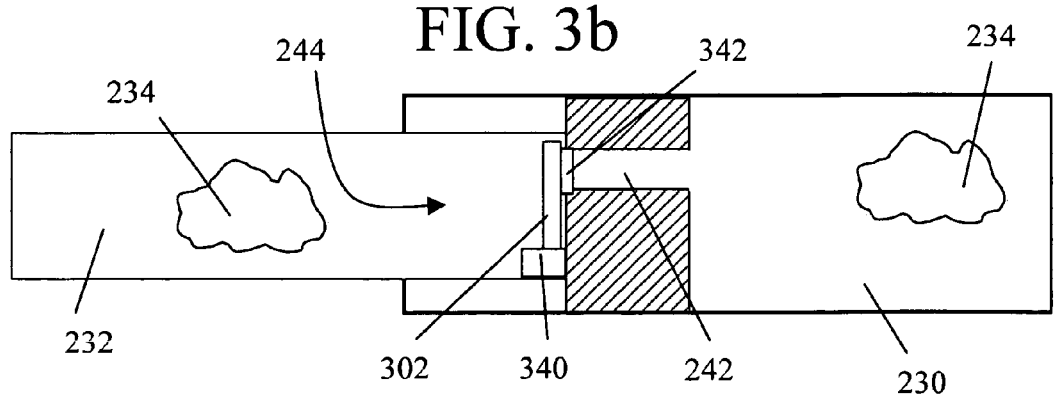
FIG. 3b shows a schematic representation of the temperature activated valve of FIG. 2 responding to a temperature above the preset temperature, in accordance with the present invention.

FIG. 3b shows a schematic of the temperature activated valve 244 responding to a temperature above the preset temperature, in accordance with the present invention. At a temperature above the preset temperature, bimetallic strip 302 deforms toward aperture 242 and flow of pressurized gas 234 between first chamber 230 and temperature compensation chamber 232 is prevented. The gas pressure within the temperature compensation chamber 232 remains greater than or equal to the gas pressure in first chamber 230 while temperature activated valve 244 remains closed.

Figure 4:
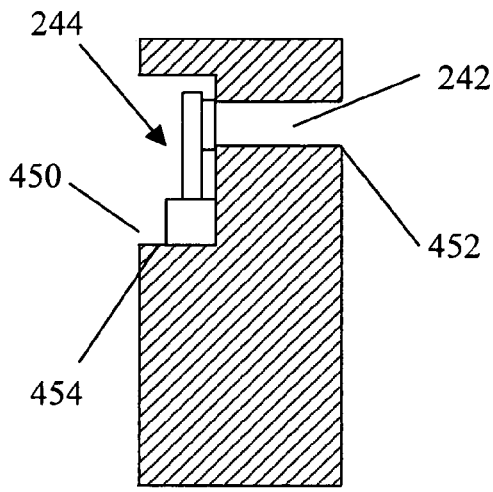
FIG. 4 shows a schematic representation of the temperature activated valve of FIG. 2 disposed within the aperture, in accordance with the present invention.

FIG. 4 shows a schematic of temperature activated valve 244 disposed within aperture 242, in accordance with one embodiment of the present invention. Aperture 242 has a first end 450 and a second end 452. The diameter of aperture 242 at first end 450 is larger than the diameter of aperture 242 at second end 452. The different diameters form a shoulder 454 within aperture 242. Temperature activated valve 244 is operably connected to aperture 242 at shoulder 454.

Figure 5:
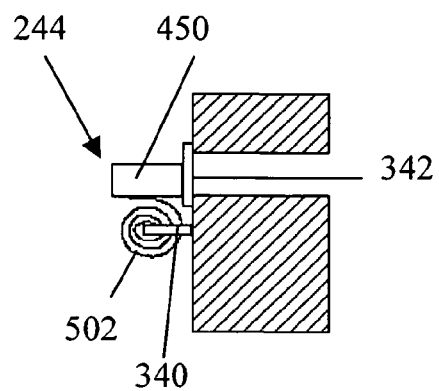
FIG. 5 shows a schematic representation of temperature activated valve of FIG. 2 including a coiled bimetallic strip in accordance with the present invention.

FIG. 5 shows a schematic of temperature activated valve 244 including a coiled bimetallic strip in accordance with the present invention. Coiled bimetallic strip 502 allows greater temperature sensitivity in a smaller space. In one embodiment, arm 340 is fixed tangentially to coiled bimetallic spring 502. Valve seat 342 is fixed to an end of arm 340. Temperature activated valve 244 operates in the same manner as described in FIG. 3, FIG. 3a, and FIG. 3b.

Figure 6:
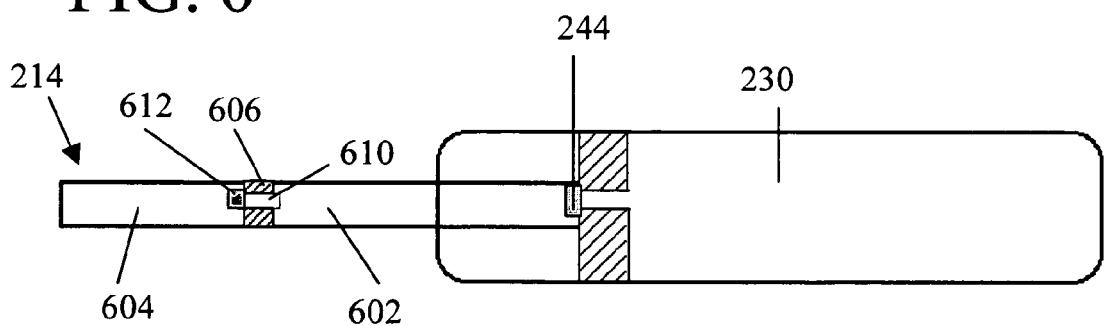
FIG. 6 shows a schematic representation of hollow piston rod of FIG. 2 including a plurality of sections in accordance with the present invention.

FIG. 6 shows a schematic of hollow piston rod 214 including a plurality of temperature compensation sections in accordance with the present invention. In this example, hollow piston rod 214 has a temperature compensation chamber divided into a first temperature compensation section 602 and a second temperature compensation section 604 separated by a fixed wall 606. Fixed wall 606 includes a fixed wall aperture 610 and a fixed wall valve 612. Temperature activated valve 244 opens at a different preset temperature than fixed wall valve 612, thereby allowing control of the decompression rate in the first chamber 230 over various temperature ranges.

In one example, temperature activated valve 244 opens at a first preset temperature, such as 15° C., increasing the effective volume of the first chamber 230 by the volume of first temperature compensation section 602. Secondary valve 612 opens at a second preset temperature, such as 10° C., further increasing the effective volume of the first chamber 230 by the volume of second temperature compensation section 604. The rate of decompression is reduced with each increase in the effective volume of first chamber 230. The preset temperature of the secondary valve 612 will always be lower than the preset temperature of temperature activated valve 244. Any additional temperature activated valves added away from the temperature activated valve 244 will have successively lower preset temperatures. Those skilled in the art will appreciate that any number of temperature compensation sections with different preset temperatures can be used to produce a desired result.

Figure 7:
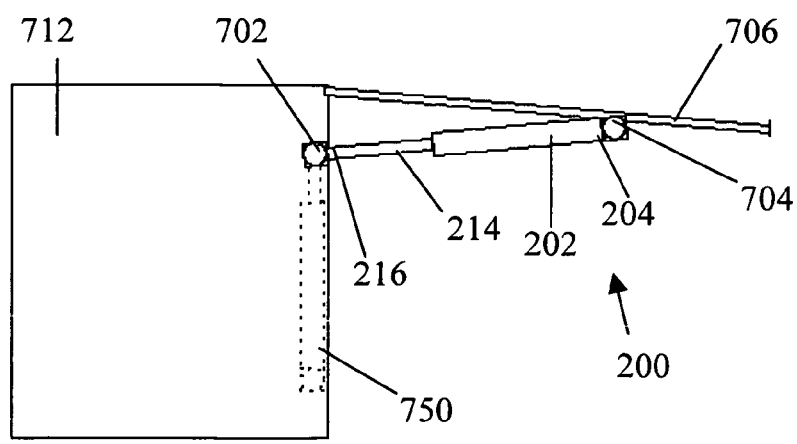
FIG. 7 shows a schematic representation of the compact temperature compensating gas spring used in conjunction with a fixed component and a load component, in accordance with the present invention.

FIG. 7 shows a schematic representation of a compact temperature compensating gas spring used in conjunction with a fixed component and a load component, in accordance with the present invention. The compact temperature compensating gas spring 200 includes a first connector plate 702 rigidly secured to the closed end 216 of the piston rod 214 and a second connector plate 704 rigidly secured to the sealed end 204 of the hollow cylinder 202. The first connector plate 702 is pivotally connected to a load component 706 such as a door, trunk lid, engine hood, hatch, or window. The second connector plate 704 is pivotally connected to a fixed component 712 such as a vehicle body, cabinet body, or window frame. The load component 706 is hinged to fixed component 712 allowing the load component 706 to travel in an arc relative to the fixed component 712. The compact temperature compensating gas spring 200 assists and controls the travel of the load component 706. Compact temperature compensating gas spring 200 exerts lift forces and hold open forces on load component 706. The compact temperature compensating gas spring 200 is shown in dashed lines in a compressed state 750 when the load component 706 is in a closed position with respect to the fixed component 712. Those skilled in the art will appreciate that the connection can be reversed so that the load component 706 is connected to the piston rod 214 and the fixed component 712 is connected to the hollow cylinder 202.

While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

What is claimed is:

1. A compact temperature compensating gas spring comprising:
   a gas filled hollow cylinder;
   a piston assembly slidably received in the gas filled hollow cylinder, the piston assembly including a piston head and a piston rod, the piston rod including a temperature compensation chamber, the piston head including an aperture formed therein in communication with the temperature compensation chamber;
   a temperature activated valve operably connected to the aperture to control gas flow between the cylinder and the temperature compensation chamber;
   at least one fixed wall disposed within the piston rod wherein the fixed wall defines a plurality of temperature compensation sections within the temperature compensation chamber, the fixed wall having a fixed wall aperture formed therein; and
   a temperature activated fixed wall valve operably connected to the fixed wall aperture to control the gas flow from a first temperature compensation section to an adjacent temperature compensation section.

2. The compact temperature compensating gas spring according to claim 1 wherein preset temperature of the temperature activated fixed wall valve is less than preset temperature of the temperature activated valve.

3. The compact temperature compensating gas spring according to claim 1 wherein preset temperatures of the temperature activated fixed wall valves decrease as each of the temperature activated fixed wall valves is further from the piston head.

4. A compact temperature compensating gas spring assembly comprising:
   a gas filled hollow cylinder having a sealed end;
   a piston assembly slidably received in the gas filled hollow cylinder, the piston assembly having a closed end and including a piston head and a piston rod, the piston rod including a temperature compensation chamber, the piston head including an aperture formed therein in communication with the temperature compensation chamber;
   a temperature activated valve operably connected to the aperture to control gas flow between the cylinder and the temperature compensation chamber;
   a fixed component operably connected to one of the sealed end and the closed end;
   a load component operably connected to the other of the sealed end and the closed end;
   at least one fixed wall disposed within the piston rod wherein the fixed wall defines a plurality of temperature compensation sections within the temperature compensation chamber, the fixed wall having a fixed wall aperture formed therein; and
   a temperature activated fixed wall valve operably connected to the fixed wall aperture to control the gas flow from a first temperature compensation section to an adjacent temperature compensation section.

5. The compact temperature compensating gas spring assembly according to claim 4 wherein preset temperature of the temperature activated fixed wall valve is less than preset temperature of the temperature activated valve.

6. The compact temperature compensating gas spring assembly according to claim 4 wherein preset temperatures of the temperature activated fixed wall valves decrease as each of the temperature activated fixed wall valves is further from the piston head.

7. A compact temperature compensating gas spring comprising:
   a gas filled hollow cylinder;
   a piston assembly slidably received in the gas filled hollow cylinder, the piston assembly including a temperature compensation chamber;
   means for controlling gas flow between the cylinder and the temperature compensation chamber based on temperature;
   means for dividing the temperature compensation chamber into temperature compensation sections; and
   means for controlling gas flow between the temperature compensation sections based on temperature.

* * * * *